United States Patent
Zanoni et al.

(10) Patent No.: US 9,692,245 B2
(45) Date of Patent: Jun. 27, 2017

(54) BATTERY MANAGEMENT SYSTEM AND POWER CONNECTOR

(71) Applicant: General Electric Company, Schenectady, NY (US)

(72) Inventors: Michael Stanley Zanoni, Glens Falls, NY (US); Christopher James Chuah, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 14/840,702

(22) Filed: Aug. 31, 2015

(65) Prior Publication Data

US 2017/0062994 A1  Mar. 2, 2017

(51) Int. Cl.
*H01R 13/68* (2011.01)
*H01R 43/16* (2006.01)
*H02J 7/00* (2006.01)
*H01R 13/66* (2006.01)
*H01M 2/34* (2006.01)
*H01R 13/684* (2011.01)
*H01M 10/42* (2006.01)

(52) U.S. Cl.
CPC ............... *H02J 7/007* (2013.01); *H01M 2/34* (2013.01); *H01R 13/6616* (2013.01); *H01R 13/684* (2013.01); *H02J 7/00* (2013.01); *H02J 7/0031* (2013.01); *H01M 2010/4271* (2013.01); *H01M 2200/103* (2013.01); *H01R 2201/26* (2013.01)

(58) Field of Classification Search
CPC ............................... H02J 7/007; H02J 7/0016
USPC .......................................................... 320/134
See application file for complete search history.

(56) References Cited

U.S. PATENT DOCUMENTS

| | | | | |
|---|---|---|---|---|
| 7,002,265 B2 * | 2/2006 | Potega | .................. | B60L 11/185 307/149 |
| 8,080,975 B2 * | 12/2011 | Bessa et al. | .......... | H02J 7/0044 320/101 |
| 8,604,753 B2 * | 12/2013 | Bessa et al. | .......... | H02J 7/0044 320/101 |
| 9,581,342 B2 * | 2/2017 | Daniels et al. | ......... | F24D 19/10 |

* cited by examiner

*Primary Examiner* — Sun Lin
(74) *Attorney, Agent, or Firm* — Dority & Manning, P.A.

(57) ABSTRACT

Example aspects of the present disclosure are directed to an improvement of an energy storage system. The energy storage system includes a power connector and a battery management system (BMS). The power connector includes a connector body having a first face and a second face which is disposed oppositely to the first face. A first terminal and a second terminal can be disposed on the first face. The first terminal and the second terminal can be configured to electrically couple the BMS to a positive conductor and a negative conductor to form a power connection, Moreover, a first current shunt can be disposed on the second face and electrically coupled to the first terminal, while the second current shunt can be disposed on the second face and electrically coupled to the second terminal.

20 Claims, 4 Drawing Sheets

BATTERY MANAGEMENT SYSTEM AND POWER CONNECTOR

FIELD OF THE INVENTION

The present subject matter relates generally to battery energy storage systems and, more particularly, to power connectors for connecting a battery energy storage device to a power system.

BACKGROUND OF THE INVENTION

Energy storage systems (e.g., battery energy storage systems) have become increasingly used to deliver power either as part of standalone energy storage systems or as part of a power generation systems (e.g., a wind farm, solar farm, gas turbine system) with an integrated energy storage system. Energy storage systems can include one or more battery banks or other energy storage devices that can be coupled to the grid via a suitable power converter.

A battery energy storage device can include a battery management system (BMS) configured to manage the battery pack by protecting the cells contained from operating outside a safe operating area, monitoring its state, calculating secondary data, reporting that data, and/or controlling the battery environment. Typical objectives of the BMS, for example, may include protecting the cells from damage, prolonging the life of the battery, and/or maintaining the battery in a proper operating state such that it can fulfill the functional requirements of the application for which it was specified.

Typically, the BMS is electrically coupled to a facility via one or more conductors to form a power connection. The conductors of common systems are inconveniently positioned within a case or housing of the BMS. As a result, forming the power connection, or making any adjustments thereto, can be difficult. Oftentimes, the BMS must be substantially disassembled in order to electrically couple the conductors and BMS. A controller (e.g., printed circuit board assembly—PCBA) can be provided on or near the BMS to control power directed to or from the battery pack. However, during operation of many current BMS configurations, the PCBA can be exposed to excessive emissions of heat or electromagnetic interference (EMI). Over time, these emissions risk damaging or destroying many components of the BMS, including the PCBA.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a power connector for connecting a battery management system (BMS). The power connector can include a connector body having a first face and an oppositely-disposed second face. A first terminal and second terminal can be disposed on the first face. The first and second terminals can be configured to electrically couple the battery management system to positive and negative conductors to form a power connection. Moreover, a first current shunt can be disposed on the second face and electrically coupled to the first terminal, while a second current shunt can be disposed on the second face and electrically coupled to the second terminal.

Another example aspect of the present disclosure is directed to an energy storage system. The energy storage device can include positive and negative terminals, a battery management system configured to monitor and control the energy storage device, and a power connector. The power connector can include a connector body having a first face and an oppositely-disposed second face. A first terminal and second terminal can be disposed on the first face. The first and second terminals can be configured to electrically couple the battery management system to positive and negative conductors to form a power connection. Moreover, a first current shunt can be disposed on the second face and electrically coupled to the first terminal, while a second current shunt can be disposed on the second face and electrically coupled to the second terminal.

Yet another example aspect of the present disclosure is directed to a power connector for connecting a battery management system (BMS). The power connector can include a connector body having a first face and an oppositely-disposed second face. The connector body can further define a first channel at the first face, the first channel being configured to receive a positive conductor; a second channel at the first face, the second channel being configured to receive a negative conductor; and a third channel at the first face. A first terminal can be disposed in the first channel, while a second terminal can be disposed in the second channel. The first and second terminals can also be configured to electrically couple the battery management system to positive and negative conductors to form a power connection. Moreover, a first current shunt can be disposed on the second face and electrically coupled to the first terminal. A second current shunt can be disposed on the second face and electrically coupled to the second terminal. Furthermore, a fuse can be disposed in the third channel and electrically coupled between the first terminal and the first current shunt.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
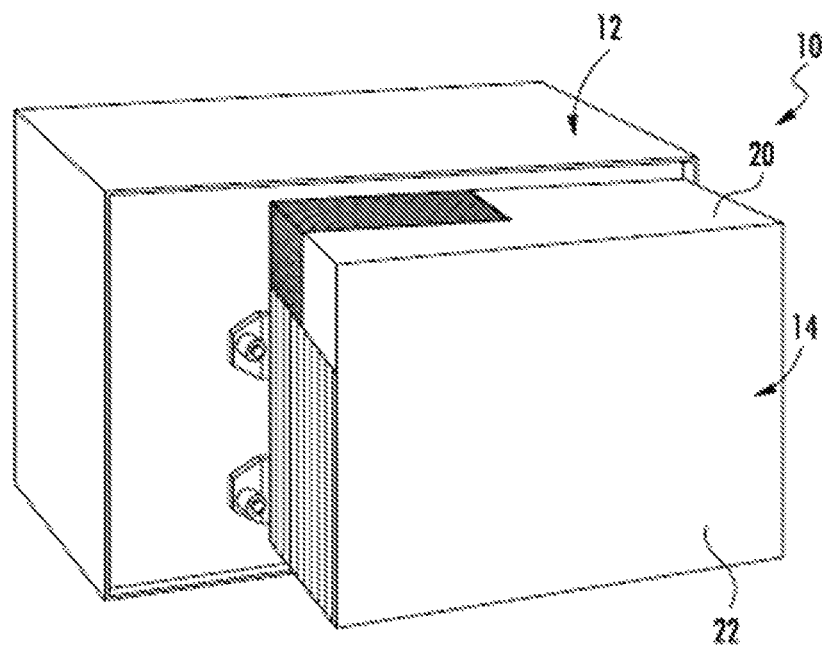
FIG. 1 illustrates a perspective view of an example energy storage system according to example embodiments the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to improved power connectors for connecting battery management systems (BMS) in an energy storage system. In some embodiments, the power connector can be configured to attach at least partially outside of the BMS housing. A user-accessible face of the power connector will be directed away from the BMS. Positioned on this face are first and second terminals for connecting to a system. The configuration of the terminals allows users to connect or disconnect a system without first taking apart the BMS. As a result, users may easily create or disable a power connection between a power system and the BMS. A fuse can also be directed away from the BMS in order to be accessed and/or removed by a user without first having to disassemble the BMS. A pair of shunts can be coupled to the terminals, and can be positioned towards the BMS housing. The pair of shunts connects to a pair of corresponding bus bars. The bus bars can extend through the BMS housing and can electrically couple the first and second terminals to an energy storage device. The bus bars can be configured to join with pairs of wires and offset undesirable inductance generated within the BMS.

The power connector according to example aspects of the present disclosure can provide various advantages. For example, the improved power connector can allow direct and easy access to the terminals and fuse. The BMS can be connected or disconnected without disassembling the BMS or removing the printed circuit board assembly (PCBA). Similarly, the fuse can be removed or replaced without disassembling the BMS or removing the PCBA. Further, the BMS can promote efficient heat flow, which results in reduced BMS temperatures and a longer PCBA component life. Still additional benefits of the BMS include improved reliability (e.g., reducing inductance interference) and a corresponding decrease in cost due to a reduction in component parts.

Figure 2:
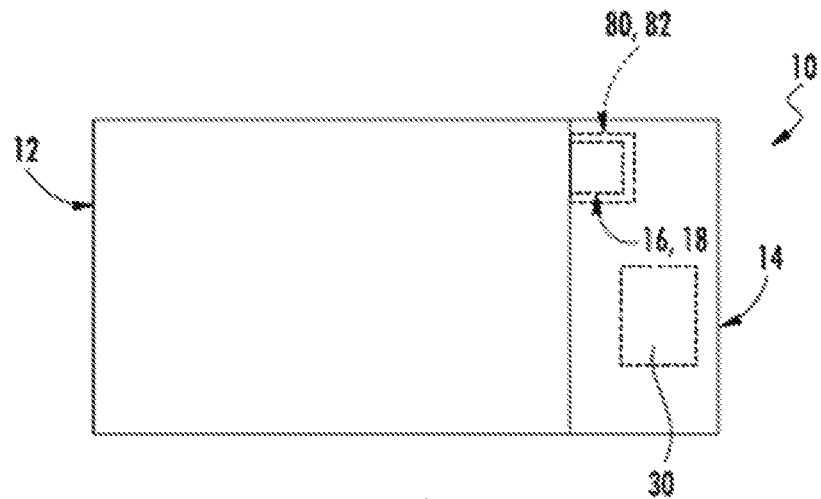
FIG. 2 illustrates a side view of an example energy storage system according to example embodiments of the present disclosure.

Turning now to FIGS. 1 through 6, example embodiments of the present disclosure will now be discussed in detail. FIGS. 1 through 2 illustrate one example embodiment of the energy storage system 10, including an energy storage device 12 and an attached battery management system (BMS) 14. In several embodiments, the BMS 14 is configured to monitor and/or control operation of the energy storage device 12. More specifically, the BMS 14 can be configured to protect the energy storage device 12 from operating outside of safe operation, monitor its state, calculate and report data, control the operating environment, and/or any other suitable control actions needed for device protection. One or more controller(s) (not pictured) can be included as part of the BMS 14. In some embodiments, the controller(s) can include a printed circuit board assembly (PCBA) logic controller implemented purely in hardware, a firmware-programmable digital signal processor, and/or a programmable processor-based software-controlled computer.

The energy storage device 12 can include one or more batteries that are electrically coupled to a positive terminal 16 and a negative terminal 18. More specifically, in certain embodiments, the energy storage device 12 can include at least one of a lithium ion battery, a sodium nickel chloride battery, a sodium sulfur battery, a nickel metal hydride battery, a nickel cadmium battery, or similar. Moreover, those of ordinary skill in the art, using the disclosures provided herein, should understand that other energy storage devices (e.g. capacitors, fuel cells, etc.) can be used without deviating from the scope of the present disclosure The BMS 14 can be attached to a positive 16 and negative terminal 18 of the energy storage device 12. A corresponding battery connector of the BMS 14 electrically couples the BMS 14 to the positive 16 and negative terminal 18, and, thereby, the energy storage device 12. As illustrated the BMS 14 can be disposed directly on the energy storage device 12 of some embodiments to readily provide a ready physical and electrical connection between the BMS 14 and energy storage system 10. The BMS 14 can include a sidewall 20, top 22, and base 24 which house a controller (not pictured) therein. The sidewall 20 can be disposed about the top 22 and base 24, thereby containing multiple BMS elements (e.g., controller, contactors 29, energy storage device couplings 80, 82, etc.). An inner surface 26 of the sidewall 20 can be directed toward the contained components, while an outer surface 28 is directed away from the same.

Disposed on base 24 and the outer surface 28 of the sidewall 20 can be a power connector 30. The power connecter 30 provides an interface with the system and can allow electrical coupling between the system and the BMS 14. The power connector 30, itself, can include a body 32 having a first and second face 36. When mounted or attached to the power connector 30, the first face 34 can be directed outward away from the BMS sidewall 20. The second face 36 is disposed opposite the first face 34. As a result, when the first face 34 is directed outward, the second face 36 is directed inward toward the BMS sidewall 20.

Figure 5:
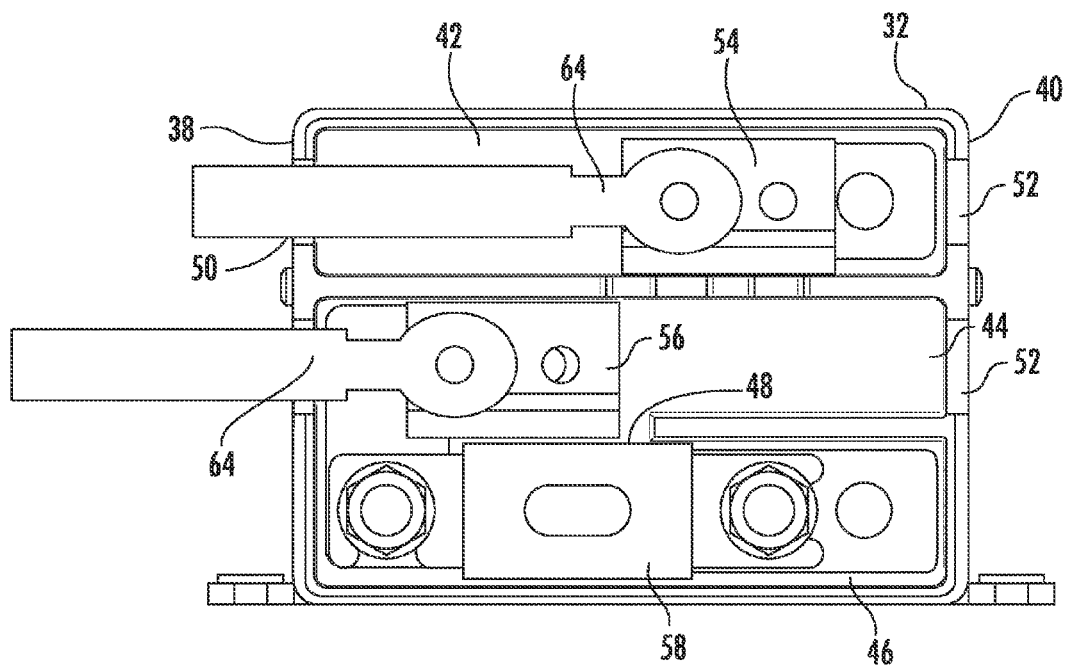
FIG. 5 illustrates a cut-away view of a right side view of the example power connector of FIGS. 3.

As shown in FIG. 5, the body 32 can also form multiple discrete channels 42, 44, 46. In some embodiments, three separate channels are formed along the first face 34. The channels 42, 44, 46 can extend at least partially across the body 32 to receive or hold one or more conductors 62, 64. In optional embodiments, the channels 42, 44, 46 can include one or more inlets 50, 52 defined in the body 32 to receive a selectively removable system conductor 62, 64. Certain channel embodiments can include multiple inlets 50, 52. Specific channel embodiments can include a first inlet 50 defined a first lateral end 38 of the body 32 and a second inlet 52 defined at an opposite second lateral end 40 of the body 32. As illustrated, both the first channel 42 and the second channel 44 can each include respective first and second inlets 50, 52. Advantageously, this configuration can allow the power connector 30 to connect to a system conductor 62, 64 disposed through either lateral end 38, 40 of the body 32.

Figure 4:
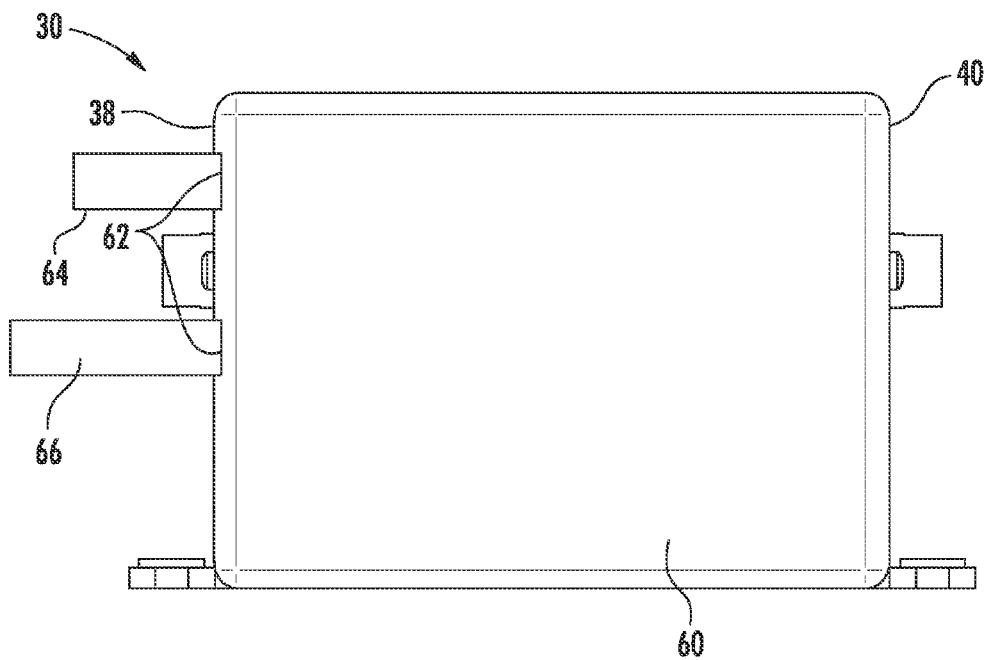
FIG. 4 illustrates a right side view of the example power connector of FIG. 3.

In optional embodiments, a separable guard plate 60 can be provided to substantially cover the channels 42, 44, 46, as seen in FIG. 4. The guard plate 60 can selectively attach to the body 32 over the first face 34. Certain embodiments of the guard plate 60 can include one or more mechanical connectors, such as a retention clip, screw, or nut-and-bolt. Additional or alternative embodiments can be formed to create a friction fit between the guard plate 60 and body 32. In embodiments including one or more channel inlets 50, 52, the guard 60 can be configured to allow inlet access. In the example embodiment of FIGS. 4 through 5, the attached guard 60 is positioned over the channel inlets 50, 52. As a result, an orifice 60 is formed, allowing the system conductors 62, 64 to extend therethrough.

Some embodiments can include a first terminal 54 and a second terminal 56 disposed on the first face 34 of the body 32, as illustrated in FIG. 5. The first terminal 54 and the second terminal 56 can interface in physical connection with a positive system conductor 62 and negative system conductor 64. When assembled, conductors 62, 64 can electrically couple the first terminal 54 and the second terminal 56 to the positive 62 and negative system conductors 64. The conductors 62, 64 can further couple the BMS 14 to the positive 62 and negative system conductors 64. As a result, a power connection can be selectively formed between the BMS 14 and the system conductors 62, 64.

A fuse 58 can also be disposed on the first face 34. During operation, the fuse 58 can monitor current through the system 10. Specifically, the fuse 58 of certain embodiments can be formed to detect a current threshold between at least one terminal 54, 56 and a shunt 68, 70. Optionally, detecting a current threshold includes deforming upon reaching the threshold. In such instances, the fuse's deformation will open an electrical circuit, preventing further transmission of any excessive currents. Although heat can be generated at the fuse 58 during operation, the heat can be advantageously directed from the front face and away from enclosed BMS elements (e.g., PCBA).

In the example embodiment of FIG. 5, the first channel 42 and the second channel 44 can receive respective first and second terminals 54, 56. A third channel 46 can receive a fuse 58 coupled to the first terminal 54 or the second terminal 56. In certain embodiments, a coupling passage 48 can be formed from at least one of the first and second channel 42, 44 to the third channel 46, allowing a coupling element to extend therethrough. The first terminal 54 and the second terminal 56 can be disposed on the first face 34 for connection with the one or more system conductor 62, 64. For instance, the first terminal 54 can receive a positive system conductor 62 while the second terminal 56 can receive a negative system conductor 64. The connection between the terminals 54, 56 and the conductors 62, 64 can electrically couple the system to the power connector 30, or be selectively disconnected to uncouple the system.

Figure 3:
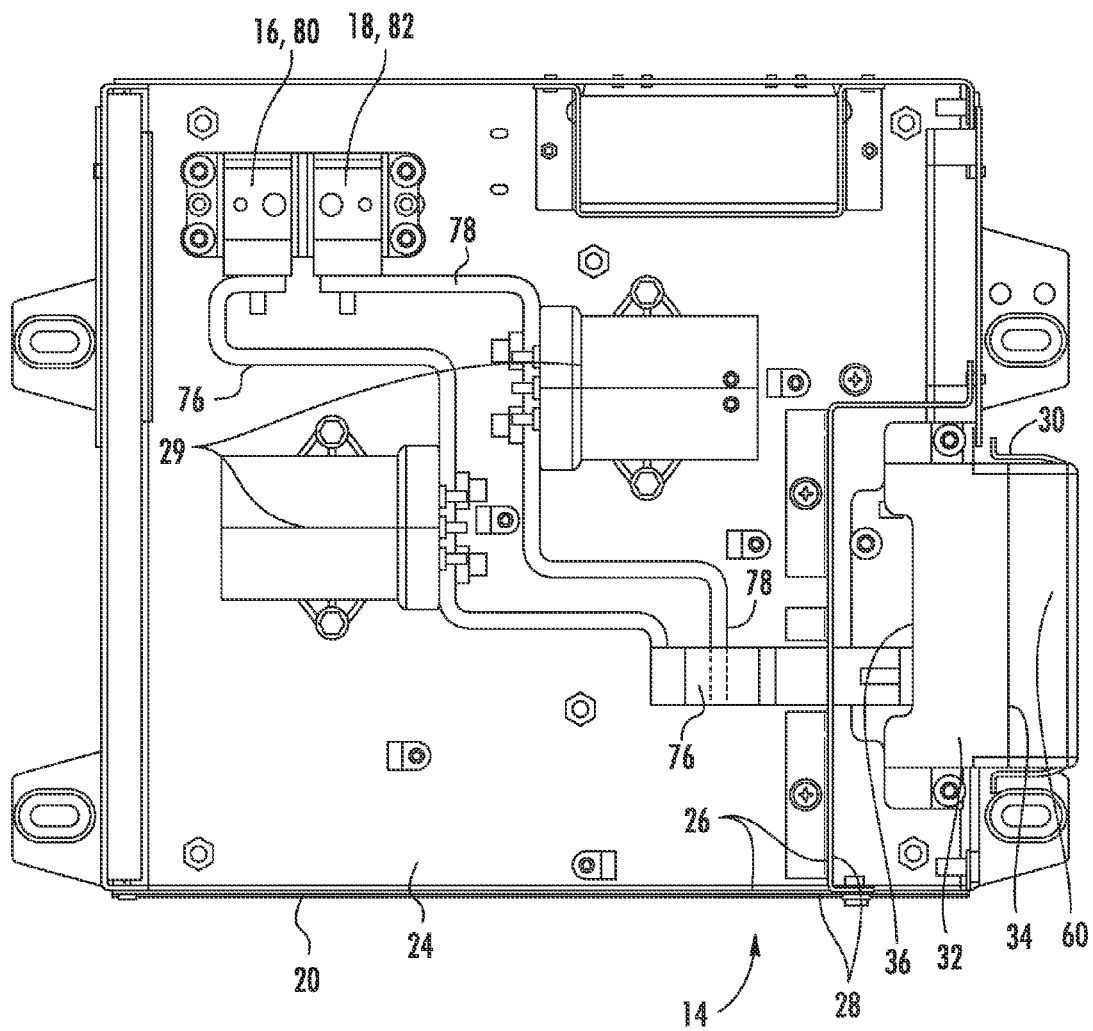
FIG. 3 illustrates a cut-away view of an example battery management system according to example embodiments of the present disclosure.
Figure 6:
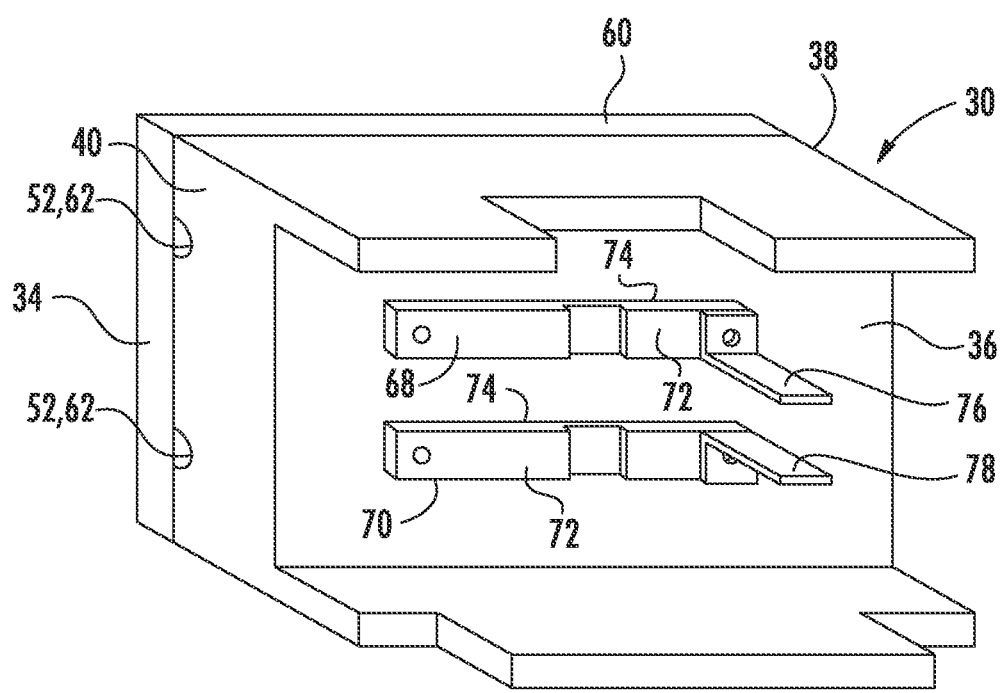
FIG. 6 illustrates a left perspective view of the example power connector of FIG. 3.

Turning to FIGS. 3 and 6, some example embodiments can include one or more current shunts 68, 70 disposed on the body 32 of the power connector 30. As shown, certain shunt embodiments 68, 70 can be disposed on the second face 36 of the body 32 and directed toward the BMS 14. The shunts 68, 70 can include discrete first and second shunts 68, 70 each having a first end 72 and a second end 74. In certain embodiments, both the first shunt 68 and the second shunt 70 can be electrically coupled at their respective first ends 72.

Embodiments that include a fuse 58 can be configured such that the fuse 58 is electrically coupled between one terminal 54, 56 and one current shunt 68, 70. For instance, as shown in FIG. 5, the fuse 58 can be electrically coupled between the second terminal 56 and the second current shunt 70. In alternative embodiments, the fuse 58 can be electrically coupled between the first terminal 54 and the first current shunt 68.

Returning to FIGS. 3 and 6, some embodiments further include one or more bus bars 76, 78 attached to the shunts 68, 70 and extending into the BMS 14. Optionally, a first bus bar 76 and a second bus bar 78 can be included. In such embodiments, the first bus bar 76 can be connected to a second end 74 of the first shunt 68 while the second bus bar 78 can be connected to a second end 74 of the second shunt 70. The bus bars 76, 78 can extend through the BMS sidewall 20 and at least partially within the enclosed area of the BMS 14 to electrically couple the shunts 68, 70 to the energy storage device terminals 16, 18. In certain embodiments, one or more mechanical fasteners, such as a mated prong or nut-and-bolt connector may attach the bus bars 76, 78 to the shunts 68, 70. One or more energy storage device coupling, including a positive coupling 80 and a negative coupling 82, can connect the bus bars 76, 78 to the energy storage device terminals.

Certain embodiments of the bus bars 76, 78 include rigid electrically-conductive rail formed from a conductive material (e.g., copper, aluminum, steel, etc.). One or more BMS elements (e.g., controller, contactors 29, energy storage device couplings 80, 82, etc.) can be joined to the bus bars 76, 78 along the bus bars' respective paths between the shunt 68, 70 and the energy storage device terminals 16, 18. The bus bars 76, 78 can form a matched path through the BMS 14. In specific embodiments, the path of the first bus bar 76 between the first current shunt 68 and the positive terminal 16 can be primarily parallel to the path of the second bus bar 78 between the second current shunt 70 and the negative terminal 18. The path can be configured to substantially cancel EMI emissions from inductance generated at the bus bars 76, 78.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power connector for connecting a battery management system (BMS), the power connector comprising:
   a connector body having a first face and a second face which is disposed oppositely to the first face:
   a first terminal disposed on the first face;
   a second terminal disposed on the first face, the first terminal and the second terminal being configured to electrically couple the BMS to a positive conductor and a negative conductor to form a power connection;
   a first current shunt disposed on the second face and electrically coupled to the first terminal; and
   a second current shunt disposed on the second face and electrically coupled to the second terminal.

2. The power connector of claim 1, further comprising a fuse disposed on the first face of the connector body, wherein the first current shunt has a first end electrically coupled to the fuse and a second end connected to a first bus bar, and the second current shunt has a first end electrically coupled to the second terminal and a second end connected to a second bus bar.

3. The power connector of claim 2, wherein the fuse is electrically coupled between the first terminal and the first current shunt.

4. The power connector of claim 2, wherein the fuse is electrically coupled between the second terminal and the second current shunt.

5. The power connector of claim 2, wherein the connector body defines a first channel configured to receive the positive conductor, a second channel configured to receive the negative conductor, and a third channel at the first face, wherein the first terminal is disposed in the first channel, the second terminal is disposed in the second channel, and the fuse is disposed in the third channel.

6. The power connector of claim 1, wherein the first bus bar and the second bus bar are discrete rigid members extending at least partially through the battery management system.

7. A method of making a power connection for a battery management system, the method comprising:
    accessing a power connector of a battery management system, the power connector comprising a first terminal and a second terminal;
    coupling a first power conductor to the first terminal; and
    coupling a second power conductor to the second terminal;
    wherein the power connector comprises a fuse, a first current shunt, and a second current shunt.

8. The method of claim 7, wherein the fuse, the first current shunt, and the second current shunt are accessible without having to adjust a printed circuit board associated with the battery management system.

9. The method of claim 7, wherein the method comprises placing a separable guard plate on the power connector.

10. The method of claim 7, wherein the power connector comprises a connector body having a first face and a second face which is disposed oppositely to the first face, the connector body defining
    a first channel at the first face, the first channel being configured to receive the first power conductor,
    a second channel at the first face, the second channel being configured to receive the second power conductor, and
    a third channel at the first face;
    wherein the first terminal is disposed in the first channel, the second terminal is disposed in the second channel, and the fuse is disposed in third channel;
    wherein the first current shunt is disposed on the second face and is electrically coupled to the first terminal, and the second current shunt is disposed on the second face and is electrically coupled to the second terminal.

11. An energy storage system, comprising:
    an energy storage device comprising a positive terminal and a negative terminal;
    a battery management system (BMS) configured to monitor and control the energy storage device; and
    a power connector comprising:
        a connector body having a first face and a second face which is disposed oppositely to the first face,
        a first terminal disposed on the first face,
        a second terminal disposed on the first face, the first terminal and the second terminal being configured to electrically couple the battery management system to a positive conductor and a negative conductor to form a power connection,
        a first current shunt disposed on the second face and electrically coupled to the first terminal, and
        a second current shunt disposed on the second face and electrically coupled to the second terminal.

12. The energy storage system of claim 11, further comprising a fuse disposed on the first face of the connector body.

13. The energy storage system of claim 12, wherein the fuse is electrically coupled between the first terminal and the first current shunt.

14. The energy storage system of claim 12, wherein the fuse is electrically coupled between the second terminal and the second current shunt.

15. The energy storage system of claim 12, wherein the first current shunt has a first end coupled to the fuse and a second end connected to a first bus bar, and the second current shunt has a first end electrically coupled to the second terminal and a second end connected to a second bus bar.

16. The energy storage system of claim 12, wherein the connector body defines a first channel configured to receive the positive conductor, a second channel configured to receive the negative conductor, and a third channel at the first face.

17. The energy storage system of claim 16, wherein the first terminal is disposed in the first channel, the second terminal is disposed in the second channel, and the fuse is disposed in the third channel.

18. The energy storage system of claim 11, further comprising a positive bus bar connected to the first current shunt, and a negative bus bar connected to the second current shut.

19. The energy storage system of claim 18, wherein the positive bus bar and the negative bus bar are discrete rigid members extending at least partially through the BMS.

20. The energy storage system of claim 11, wherein the power connector is disposed on a sidewall of the BMS, wherein the first face is directed outward away from the BMS sidewall, and wherein the second face is directed inward toward the BMS sidewall.

* * * * *